(No Model.)

G. LANÇON.
MANUFACTURE OF ARTIFICIAL STONES.

No. 286,023. Patented Oct. 2, 1883.

Witnesses
C. J. Hedrick
Wm A. Hedrick

Inventor:
Gédéon Lançon
by A. Pollok
his attorney.

UNITED STATES PATENT OFFICE.

GÉDÉON LANÇON, OF SEPTMONCEL, NEAR ST. CLAUDE, ASSIGNOR TO STE. E. E. KIPLING, OF PARIS, FRANCE.

MANUFACTURE OF ARTIFICIAL STONES.

SPECIFICATION forming part of Letters Patent No. 286,023, dated October 2, 1883.

Application filed September 3, 1883. (No specimens.) Patented in France November 15, 1881, No. 145,855.

*To all whom it may concern:*

Be it known that I, GÉDÉON LANÇON, of Septmoncel, near St. Claude, Department of the Jura, France, have invented a certain new and useful Improvement in the Manufacture of Artificial Gems, which improvement is fully set forth in the following specification.

The present invention relates to the manufacture of artificial gems or brilliants, and has for its object the production of stones of great resistance and fine effect, closely resembling emerald, sapphire, and other precious stones.

The invention consists in combining with a garnet or other suitable stone a colored enamel in the manner hereinafter described.

The garnet or other stone is first cut, the table and bottom part being in two separate pieces. Both these parts are hollowed out and the cavities filled with the enamel, which is properly colored to produce the effect desired. The two parts of the garnet, which are made to fit each other accurately, are placed together and are firmly united by means of the core of enamel.

Instead of making the garnet in two parts, the table and bottom parts may be cut in one piece and the enamel joined onto the point of the bottom part.

Figure 1:
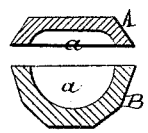
Figure 2:
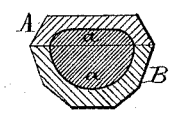
Figure 3:
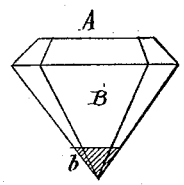

In the accompanying drawings, Figures 1 and 2 are sections of a stone made according to my invention, and Fig. 3 an elevation of another form of stone, also made in accordance with the invention.

Referring to Figs. 1 and 2, A is the table, and B the bottom part, cut in separate pieces. Both parts are hollowed, as shown at *a*. These hollows are filled with the enamel, which may be green, blue, red, or other color, according to the color of the gem it is desired to imitate. When the two parts are placed together, the enamel constitutes a central core which cannot be changed by wear or friction.

The two parts A and B may be fastened together in any suitable way. The enamel itself may be made the means of uniting them, it being made to adhere to the garnet or other stone by baking, in the manner well understood.

As shown in Fig. 3, the garnet is cut with its table A and bottom part, B, in one piece, and to the point of the bottom part is fastened the enamel *b*.

It will be understood that while garnet alone is referred to as constituting the body of the artificial gem, other suitable stones—such as ordinarily used in the trade—may be employed. Strass, for instance, may be substituted for the garnet, either for the bottom part or for the whole of the gem.

Modifications may be made in carrying out the invention without departing from the spirit thereof. For example, the stone may be cut with the table and bottom part in one piece, hollowed out from below, the core of enamel introduced and the aperture then closed in any suitable way.

I claim—

1. An imitation gem having a colored core or filling, substantially as described.

2. An imitation gem composed of garnet or other suitable stone cut in two parts, hollowed out and containing a core or filling of colored enamel, substantially as described.

3. An imitation gem cut in two parts, hollowed out and inclosing a core of colored enamel, the two parts being united by means of the enamel, substantially as described.

4. An imitation gem of garnet or other stone cut with a table and bottom part, and having colored enamel applied to the point of the bottom part, substantially as described.

In witness whereof I have hereunto signed my name in the presence of two subscribing witnesses.

GÉDÉON LANÇON.

Witnesses:
ARTHUR W. KIPLING,
GEORGES CHAPINS.